Aug. 9, 1955  E. J. HAUPT ET AL  2,714,796
SPRING TINE MOUNTING CLIP
Filed Aug. 3, 1954
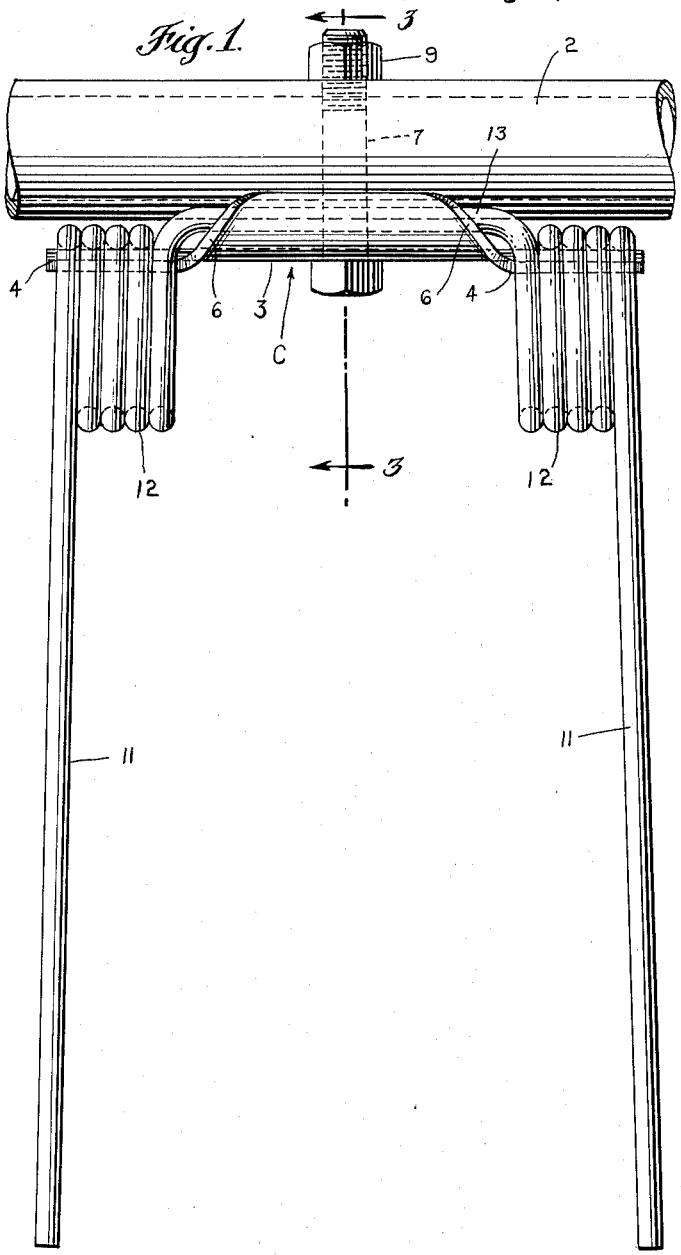
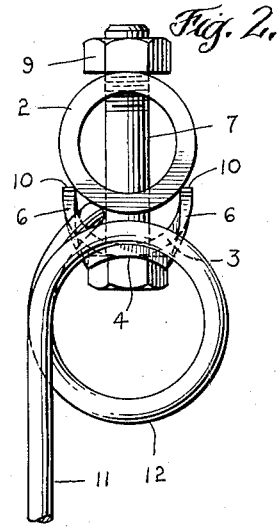
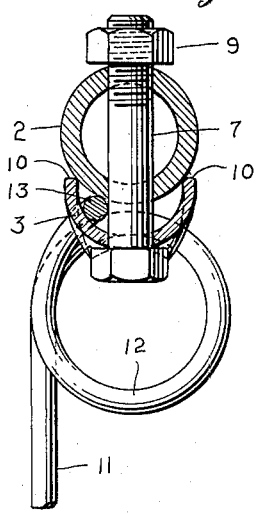
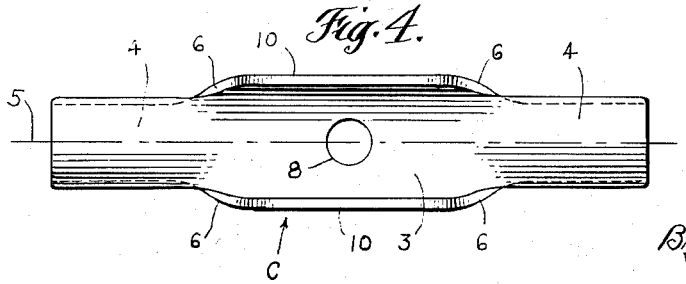
INVENTORS
Eugene J. Haupt
James W. McDuffie
By Richard E. Babcock Jr.
ATTORNEY United States Patent Office 2,714,796
Patented Aug. 9, 1955

2,714,796

SPRING TINE MOUNTING CLIP

Eugene J. Haupt, Lancaster, and James W. McDuffie, New Holland, Pa., assignors to The Sperry Corporation, New Holland, Pa., a corporation of Delaware Application August 3, 1954, Serial No. 447,549

4 Claims. (Cl. 56—400)

This invention relates to a spring tine mounting clip or device of the type generally disclosed in the Happe et al. Patent 2,607,183 of August 19, 1952, in which the device functions to support the interconnected spring coils of a pair of rake tines on a rake bar and to grip the interconnecting portion between the said coils to hold the coils against both rotational and axial displacement.

It is the object of the present invention to improve on the two-piece or sectional clip of the Happe et al. patent above-mentioned by forming a functionally equivalent clip of simplified integral construction with a minimum number of steps.

Such a clip is formed from an integral generally rectangular metal sheet or plate and comprises a medial saddle portion and oppositely directed ends or wings, the saddle and wings being in alignment along a common longitudinal axis of symmetry, and the saddle and wings respectively being arcuately bent in opposite directions transversely to the axis of symmetry, whereby the relatively parallel edges of the saddle portion may abut against a cooperating rake bar to support the wings in spaced relation from the bar, and thus, provide clearance for the reception of the rake tine spring coil on the wings, the medial portion of the saddle between said laterally opposed edges being similarly spaced from the rake bar to provide a space for reception of a connection portion or element extending between the spring coils.

A preferred exemplification of such a device is illustrated in the accompanying drawings in which:

Figure 1 represents a fragmentary elevation of a portion of a rake bar showing the manner in which the clip of the invention supports a pair of interconnected spring tines on the rake bar.

Figure 2, an end elevation of the structure shown in Figure 1, the rake tines being broken away to conserve space;

Figure 3, a section taken on the line 3—3 of Figure 1, looking in the direction of the arrows; and, Figure 4, a plan view of the spring clip per se.

Referring now in detail to the accompanying drawing, the reference character 2 designates a conventional rake bar such as is employed on the raking reel assembly of side delivery rakes, gathering reels, pick-up mechanisms, and the like. Such a bar is preferably of tubular cylindrical construction, preferably being fabricated of metal piping or similar rigid material.

The mounting clip designated C in its entirety is formed from a metal plate of integral generally rectangular configuration comprising a medial saddle portion 3 and oppositely directed wings or end portions 4. The saddle portion or saddle 3 and the wings 4—4 respectively are disposed in alignment along a common longitudinal axis of symmetry as indicated by the numeral 5 in Figure 4, this axis 5 being disposed to extend parallel to the rake bar 2 in the assembled relation of these elements. Saddle 3 is arcuately curved on opposite sides of and transversely to the axis 5 about a radius which is selected to be smaller than the radius of curvature of the rake bar 2, and the wings 4 are respectively curved arcuately in an opposite direction transversely to the axis 5. Due to this arcuate bending of the saddle 3 and wings 4—4 in opposite directions, it will be seen that the opposed lateral edges of the clip at the juncture between each wing 4 and the saddle 3 will extend diagonally to the axis 5 at the locations designated 6 respectively. These diagonal edge portions will thus serve to brace the wings 4 against deflection about their juncture with the saddle 3. A bolt 7 serves to clamp the clip C in operative relation against the rake bar 2, said bolt 7 extending diametrically through the bar 2 and through a point defined by hole 8 medially of the saddle along the axis 5.

It will be seen that when the clip C is drawn tight against the bar 2 by means of a nut 9 threaded on the bolt 7 the laterally opposed edge portions or edges 10—10 of the saddle 3 will abut against the rake bar 2 in parallel relationship to each other and to the rake bar axis to support the clip with its axial portion 5 and wings 4—4 in spaced relation from the rake bar. This will necessarily result due to the fact that the saddle 3 is curved about a smaller radius than the rake bar 2.

The clip C serves as a support for a pair of rake tines 11—11 having spring coils 12—12 supported on and receiving the respective wings 4—4. A connecting portion 13 extending between and integral with the respective coils 12—12 extends between the bar 2 and the saddle 3 on one lateral side of the bolt 7. It will be understood that the tines 11, their coils and connective portion are thus assembled with the clip C before application of the latter to the rake bar. As the nut 9 is tightened on the bolt 7 to draw the clip C firmly against the bar 2, it will be seen that the connecting portion 13 will be clampingly engaged by and between the bolt 7, the bar 2, and the saddle 3, respectively to thus firmly secure the entire rake tine assembly against both rotational and axial displacement.

By virtue of the invention it is believed apparent that it is possible to produce a spring tine mounting clip or device more simply and economically than has heretofore been possible, due both to the integral construction and to the fact that it is unnecessary to offset portions of the body of the clip in different planes with the necessity for compound curvatures in the clip, as distinguished from the simple curves or bends incident to fabrication of the clips of the instant invention.

The invention claimed is:

1. A rake tine assembly comprising a generally cylindrical rigid rake bar, a mounting clip of integral metal construction and of generally rectangular configuration comprising a medial saddle and oppositely directed wings, said saddle and wings respectively being in alignment along a common longitudinal axis of symmetry disposed parallel to said rake bar, said saddle being curved arcuately toward said bar on opposite sides of and in a plane extending transversely to said axis about a radius smaller than the radius of curvature of said bar, and said wings respectively being curved away from said bar in a plane extending transversely to and on opposite sides of said axis, the opposed lateral edges of said mounting clip extending diagonally to said axis at the juncture between each wing and the medial saddle and serving to brace said wings against deflection about their juncture with the saddle, a bolt disposed diametrically through said bar and through a point medially of the saddle along said axis, said bolt clamping the opposed lateral edges of said saddle against the bar to support the clip on said bar with its axis of symmetry spaced from the bar, in combination with a pair of rake tines having spring coils supported on and receiving the respective wings, a connecting portion extending generally parallel to said axis of symmetry between and integral with the respective coils, said connecting portion extending between the bar and saddle on one lateral side of the said bolt and being clampingly engaged by and between the bolt, the bar, and the saddle respectively.

2. A rake tine assembly comprising a generally cylindrical rake bar, a mounting clip of integral metal construction and of generally rectangular configuration comprising a medial saddle and oppositely directed wings, said saddle and wings respectively being in alignment along a common longitudinal axis of symmetry disposed parallel to the said rake bar, said saddle being curved arcuately toward said bar on opposite sides of and in a plane extending transversely to said axis about a radius smaller than the radius of curvature of said bar, the side edges of said saddle engaging said bar and positioning said axis of symmetry in spaced relation to the bar, and said wings respectively being curved away from said bar in a plane extending transversely to and on opposite sides of said axis.

3. A rake tine mounting clip constructed of integral rigid material of generally rectangular configuration comprising a medial saddle portion and oppositely directed wings, said saddle and said wings respectively being in alignment along a common longitudinal axis of symmetry, said saddle being arcuately curved in a plane transverse to said axis and having relatively parallel lateral edges, said wings respectively being curved in an opposite direction from said saddle in a plane transverse to said axis, said saddle being formed with a bolt receiving hole located along said axis medially of the clip.

4. A spring tine mounting clip of integral rigid construction and of general rectangular configuration comprising a medial saddle and a wing projecting from one end of said saddle, said saddle and said wing respectively being in alignment along a common longitudinal axis of symmetry, the saddle being curved arcuately in one direction in a plane transverse to said axis and the wing being curved in an opposite direction in a plane transverse to said axis.

References Cited in the file of this patent

UNITED STATES PATENTS 2,607,182     Hill _____ Aug. 19, 1952